(12) United States Patent
Takayama et al.

(10) Patent No.: US 7,192,225 B2
(45) Date of Patent: Mar. 20, 2007

(54) MACHINE TOOL

(75) Inventors: Naoshi Takayama, Yamatokoriyama (JP); Hikaru Ishigaki, Yamatokoriyama (JP); Takayuki Akai, Yamatokoriyama (JP); Nobuyuki Kimura, Yamatokoriyama (JP)

(73) Assignee: Mori Seki Co., Ltd., Yamatokoriyama (JP)

( * ) Notice: Subject to any disclaimer, the term of this patent is extended or adjusted under 35 U.S.C. 154(b) by 0 days.

(21) Appl. No.: 11/420,483

(22) Filed: May 26, 2006

(65) Prior Publication Data

US 2006/0269375 A1   Nov. 30, 2006

(30) Foreign Application Priority Data

May 30, 2005   (JP) ............................ 2005-157289

(51) Int. Cl.
  *B23Q 11/08*   (2006.01)
(52) U.S. Cl. ...................... 409/134; 409/212; 74/612; 483/3
(58) Field of Classification Search ............... 409/134, 409/202, 212, 135–137; 408/241 G; 451/451, 451/455; 483/3; 29/DIG. 56, DIG. 60; 74/608–609, 612–613
See application file for complete search history.

(56) References Cited

U.S. PATENT DOCUMENTS 5,178,499 A * 1/1993 Umeda et al. ............... 409/134
5,649,887 A * 7/1997 Taki et al. ...................... 483/3
5,897,430 A * 4/1999 Haller .......................... 451/451
6,135,103 A * 10/2000 Katamachi .................... 125/21
6,749,495 B2 * 6/2004 Grund et al. ................ 451/451
2006/0270540 A1 * 11/2006 Takayama et al. ........... 409/134

FOREIGN PATENT DOCUMENTS

| DE | 3411394 A1 | * | 10/1985 |
| JP | 5-60294 A | * | 3/1993 |
| JP | H06-024847 U | | 4/1994 |
| JP | 7-266184 A | * | 10/1995 |
| JP | 8-174376 A | * | 7/1996 |
| JP | 11-70440 A | * | 3/1999 |
| JP | 2006-95666 A | * | 4/2006 |
| JP | 2006-110659 A | * | 4/2006 |

* cited by examiner

*Primary Examiner*—Erica Cadugan
(74) *Attorney, Agent, or Firm*—Judge & Murakami IP

(57) ABSTRACT

Machine tool having a bed, a table arranged on the bed, a first saddle provided free to travel back and forth, a second saddle supported on the first saddle and provided free to travel side to side, a spindle head provided free to travel perpendicularly on the second saddle, a main spindle situated above the table and by the spindle head supported free to rotate on its center axis, a front cover provided on the front side of the bed and furnished with doors that open and close sideways, and top covers configured with one end sideways shiftably connected to the front side of the first saddle, and with another end connected extensibly/retractably to the top of the front-cover doors, therein being configured for permitting back-and-forth-directed movement of the first saddle.

3 Claims, 9 Drawing Sheets

MACHINE TOOL

BACKGROUND OF THE INVENTION

1. Technical Field

The present invention relates to machine tools furnished with: a bed; a table on which a workpiece is carried and which is disposed on the bed; a main spindle for retaining a tool, and provided to rotate freely on its center axis; a feed mechanism for shifting the table and the main spindle relatively to each other along three orthogonal axes within the machining area, and a cover for covering the machining area.

2. Description of the Related Art

Such machine tools known to date include the example composed of, primarily: a bed made up of a rectangular base, two sidewalls provided standing along respective right and left sides of the base and opposing each other across an interval; a table on which a workpiece is carried and which is disposed on the base portion of the bed; a cross beam made from a long beam disposed lengthwise between the sides with the longitudinal end parts of the cross beam supported on top of the side walls of the bed so that the cross beam can move freely within a horizontal plane along the front-to-back orientation of the bed; a saddle that is supported to move freely horizontally side-to-side (right-to-left) on the front of the cross beam; a spindle head that is supported to move freely vertically on the front of the saddle; and a main spindle that holds a tool and is supported by the bottom end portion of the spindle head so that the axis of the main spindle is vertical and the main spindle can rotate freely on the main spindle axis above the table.

This machine tool also has a first feed mechanism for moving the cross beam back and forth, a second feed mechanism for moving the saddle side to side, a third feed mechanism for moving the spindle head vertically, a rotational drive mechanism for rotating the main spindle on the main spindle axis, and a cover that encloses the machine tool and has doors that open by sliding side-to-side at the front (the front of the bed).

A workpiece held on the table is processed by the tool held by the main spindle as a result of the first feed mechanism moving the cross beam back and forth, the second feed mechanism moving the saddle side-to-side, the third feed mechanism moving the spindle head vertically, and the rotational drive mechanism rotating the main spindle on the main spindle axis. Chips, swarf, and other waste produced during machining, and cutting fluid supplied as needed to the point of contact between the tool and the workpiece flies outside the machining area but is prevented from exiting the machine tool by the cover.

When the workpiece is relatively small and light, the operator can load and unload the workpieces from the table, but when the work is heavy and large a crane or other type of hoist must be used to place the workpiece in and remove the workpiece from the machine tool. In this situation, however, the doors of this cover may not afford an opening that is large enough to carry the workpiece in and out of the machine tool, thus requiring removing part of the cover. This prevents efficiently changing the workpiece on the table.

Japanese Unexamined Utility Model App. Pub. No. H06-24847 discloses a machine tool having a cover comprising a front cover, a first top cover, a second top cover, and a third top cover. The front cover has a door that slides side-to-side to open, and is disposed in front of the base portion of the bed to cover the space enclosed between the two side walls of the bed. The first top cover is disposed between the side walls on both sides of the bed and covers the top of the space between the side walls. The second top cover is disposed covering the top of this space between the left side of the spindle head, the left side wall of the bed, the front of the cross beam, and the first top cover. The third top cover is disposed covering the top of this space between the right side of the spindle head, the right side wall of the bed, the front of the cross beam, and the first top cover.

The first top cover is an extensible/retractable sheet that shifts back and forth and allows the spindle head (cross beam) to move back and forth. One end of the first top cover is connected to the top of the cover so that the first top cover can be freely disconnected, and the other end is connected to the front of the spindle head.

The second top cover and third top cover are also extensible/retractable sheets that can move side-to-side and allow the spindle head (saddle) to move side-to-side. One end of the second top cover is connected to the top of the left side wall of the bed, and the other end is connected to the left side of the spindle head. One end of the third top cover is connected to the top of the right side wall of the bed, and the other end is connected to the right side of the spindle head.

The other end part of the first top cover is connected to the spindle head so that the spindle head can move vertically and side-to-side, and the one end of the second and third top covers is connected to the left wall and right wall, respectively, of the bed so that the top covers can move back and forth with the cross beam.

When a crane or other hoist mechanism is used to carry workpiece into or remove workpiece from this machine tool having a front cover, first top cover, second top cover, and third top cover, the one end of the first top cover is disconnected from the front cover and rolled up toward the spindle head. Thus rolling up the first top cover and opening the door of the front cover efficiently forms the opening needed to move workpiece into and out from the machine tool, and therefore enables efficiently changing the workpiece.

A problem with the machine tool disclosed in Utility Model App. Pub. No. H6-24847, however, is that in order to roll the first top cover to the spindle head and open the part covered by the first top cover, the one end of the first top cover must be disconnected from the front cover and rolled toward the spindle head. After the workpiece is changed, the first top cover must then be unrolled and the one end reattached to the front cover. This is tedious and time-consuming.

BRIEF SUMMARY OF THE INVENTION

An object of the present invention is therefore to solve this problem by making available a machine tool that enables the operator to easily open and close the top cover without trouble.

To achieve this object, a machine tool according to the present invention has a bed; a table which is disposed on the bed and on which work is held; a moving component disposed on the bed and provided free to travel at least on a horizontal first axis that is front-to-rear oriented; a main spindle which is supported by the moving component to rotate freely on the main spindle axis and holds a tool; a feed mechanism for moving the table and the moving component relatively on three perpendicular axes including the first axis, and moving the table and main spindle relatively in a machining area; and a cover for covering the machining area by means of a front cover covering a front side of the machining area and first top covers covering a top side of the machining area. The front cover is disposed on the front side of the bed and is furnished with doors that open and close moving on a horizontal second axis perpendicular to the first axis. The first top covers have one end connected to the front side of the moving component to enable movement on the second axis, and the other end connected to the top part of the door of the front cover to extend and retract freely on the first axis and allow the moving component to move on the first axis.

Work can be processed by this machine tool as a result of the feed mechanism moving the table and moving component relatively on three perpendicular axes including the first axis (aligned side-to-side, that is, left-to-right), moving the table (the work on the table) and main spindle (the tool held by the main spindle) relative to each other in the machining area, and a rotational drive mechanism driving the main spindle rotationally on the main spindle axis.

The first top cover does not interfere with movement of the moving component on the first axis because the first top cover can extend and retract freely on the first axis when the moving component moves on the first axis.

Furthermore, by covering the machining area with a cover comprising a front cover covering the front of the machining area and first top covers covering the top of the machining area, chips and other waste from the machining process and cutting fluid supplied appropriately to where the tool contacts the workpiece are also prevented from flying outside the machine tool during the machining process.

When the machining process ends and the worker moves the doors of the front cover on the second (side-to-side) axis to open in order to replace the workpiece on the table, the first top covers also move with the doors along the second axis because one end of each top cover is connected movably along the second axis to the front of the moving component and the top of the machining area is thus opened. Conversely, when the doors of the front cover are moved on the second axis (side-to-side) and closed, the first top covers also move with the doors on the second axis and the top of the machining area is closed.

A worker can thus easily open and close the top of the machining area by simply opening and closing the doors of the machine tool according to the present invention because the first top cover is rendered movably along the second axis together with the doors when the doors of the front cover open and close. Work can therefore be efficiently loaded and unloaded from the table using a crane or other hoist mechanism.

Preferably, the machine tool also has linkage members disposed above or below the first top covers with one end connected to the one end of a first top cover and the other end connected to a top part of a door of the front cover. The linkage members can extend and retract on the first axis and enable the moving component to move on the first axis.

By rendering the first top covers to extend and retract freely on the first axis, the rigidity of the covers may be low depending on how the covers are constructed. As a result, even if the other end of the first top covers moves on the second axis when the doors open and close, the one end of the first top covers may not move at the same time.

However, by providing linkage members connecting the one end of the first top covers to the doors, the one end of the first top covers can be moved in conjunction with the doors opening and closing (that is, in conjunction with moving the other end of the first top covers). This prevents damaging the first top covers and prevents the first top covers from not opening or closing completely.

Yet further preferably, the bed has a rectangular base and two opposing side walls rising vertically from both second-axis sides of the base with a gap therebetween; the moving component is supported freely movably along the first axis on top portions of both side walls of the bed; and the first top covers are disposed above the top of both side walls of the bed. This machine tool also has second top covers disposed between both side walls of the bed and the first top covers to close the gaps between the side walls and the first top covers. The second top covers have one end connected to the front of the moving component, and the other end connected to the top part of the front cover to extend and retract freely along the first axis and allow movement of the moving component on the first axis.

If the bed has a rectangular base and two opposing side walls rising vertically from both sides of the base along the second axis with a gap therebetween, and the first top covers are disposed above the tops of the side walls of the bed in order to increase the size of the opening afforded by the first top covers more than a predetermined size, to open the first top covers without interfering with the side walls of the bed, or to increase the height at which the first top covers are located, a gap may result between the side walls and the first top covers, and waste and cutting fluid may escape through this gap outside the machine tool.

The machine tool according to the invention prevents waste and cutting fluid from exiting through this gap, however, by providing second top covers having one end connected to the front of the moving component and the other end connected to the top part of the front cover so that the second top covers extend and retract freely along the first axis and close the gap between the side walls on both sides of the bed and the first top covers.

By connecting one end of first top covers that extend and retract freely along a first axis to the front side of a moving component so that the first top covers can move on a second axis, and connecting the other end of the first top covers to the top part of the doors of the front cover so that the first top covers move along the second axis together with the doors, a machine tool according to the present invention enables easily opening and closing the first top covers by simply opening and closing the doors.

DETAILED DESCRIPTION OF THE INVENTION

Figure 1:
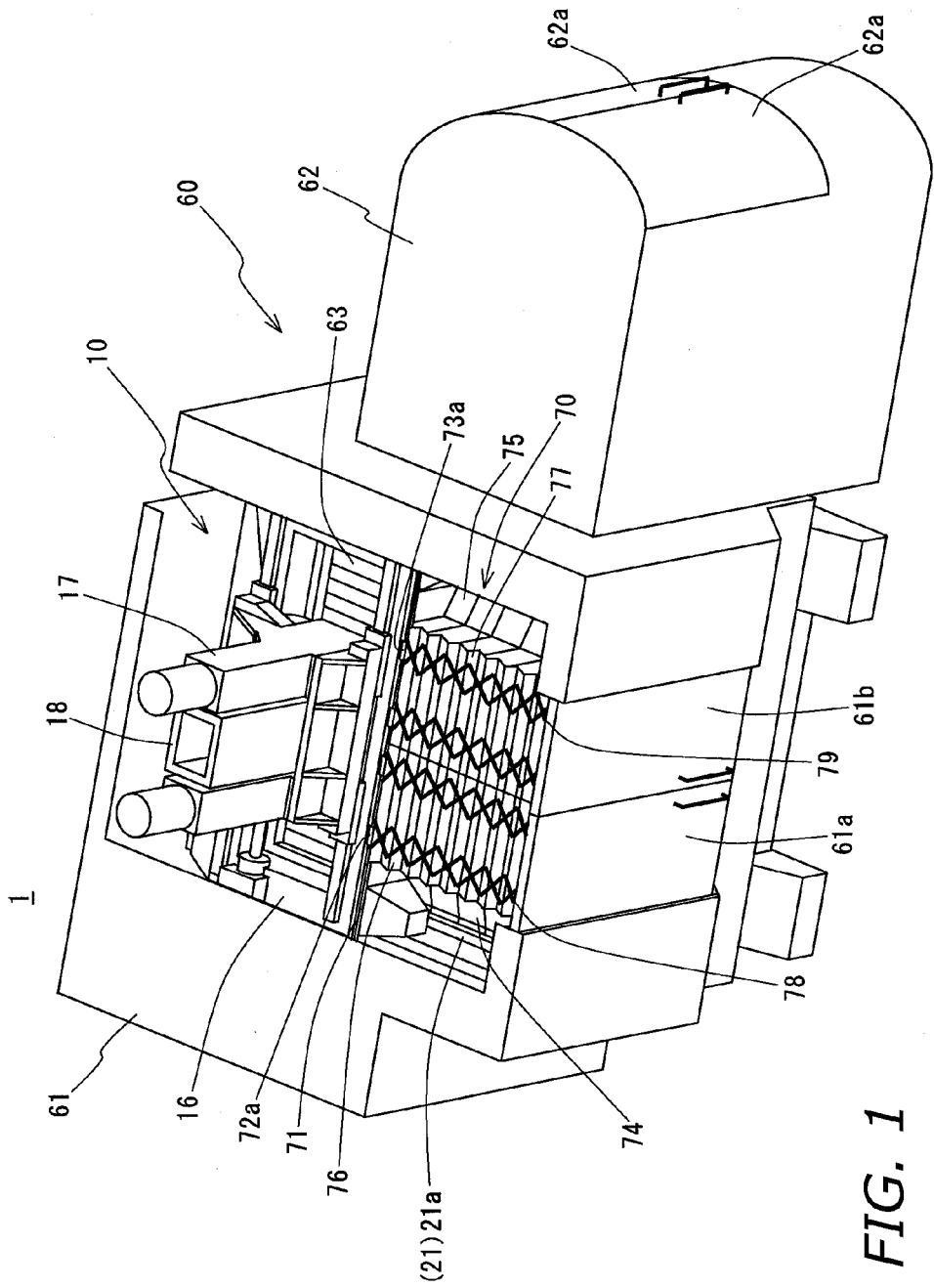
FIG. 1 is an oblique schematic view of a machine tool according to a preferred embodiment of the invention.
Figure 2:
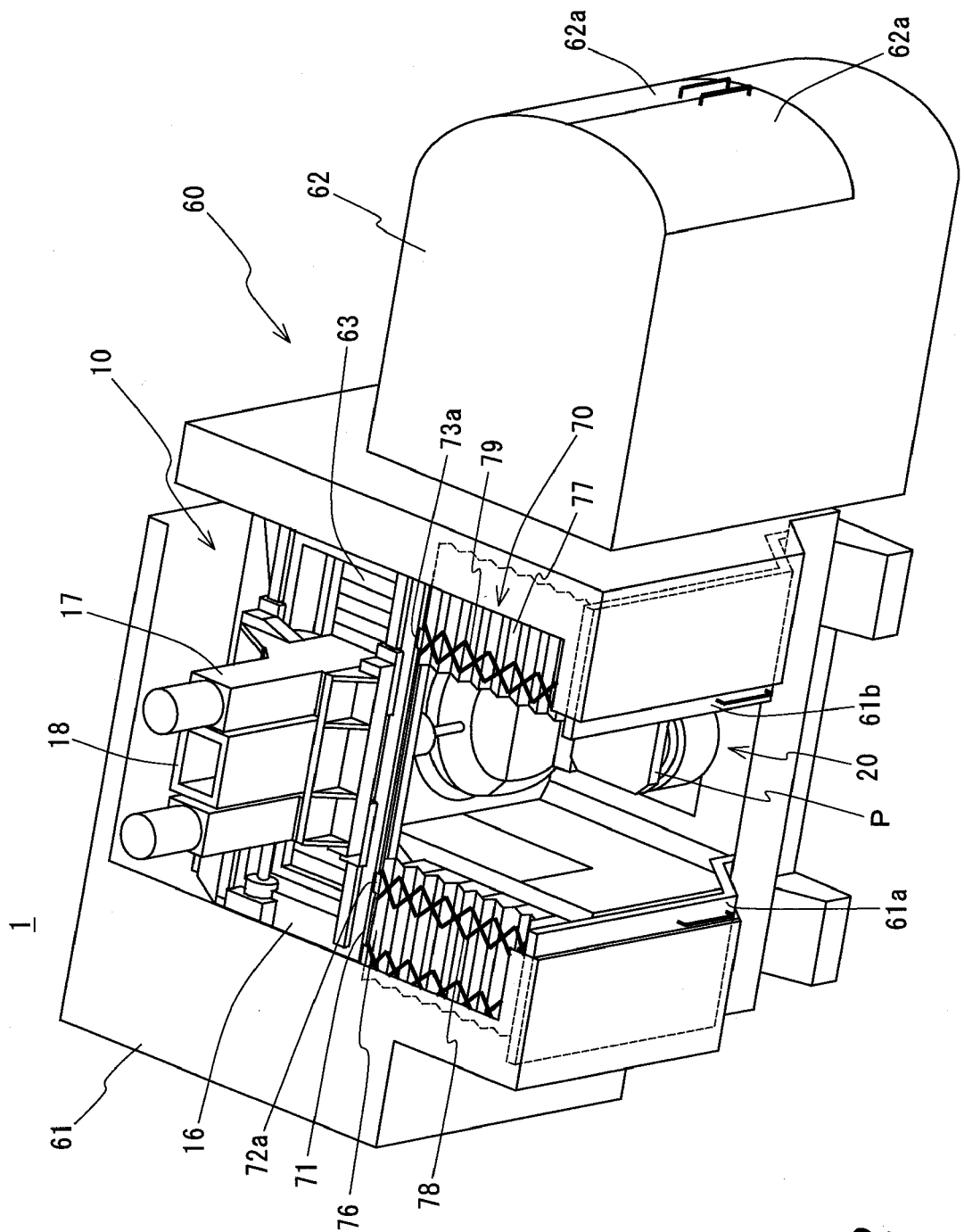
FIG. 2 is an oblique schematic view of a machine tool according to a preferred embodiment of the invention.
Figure 3:
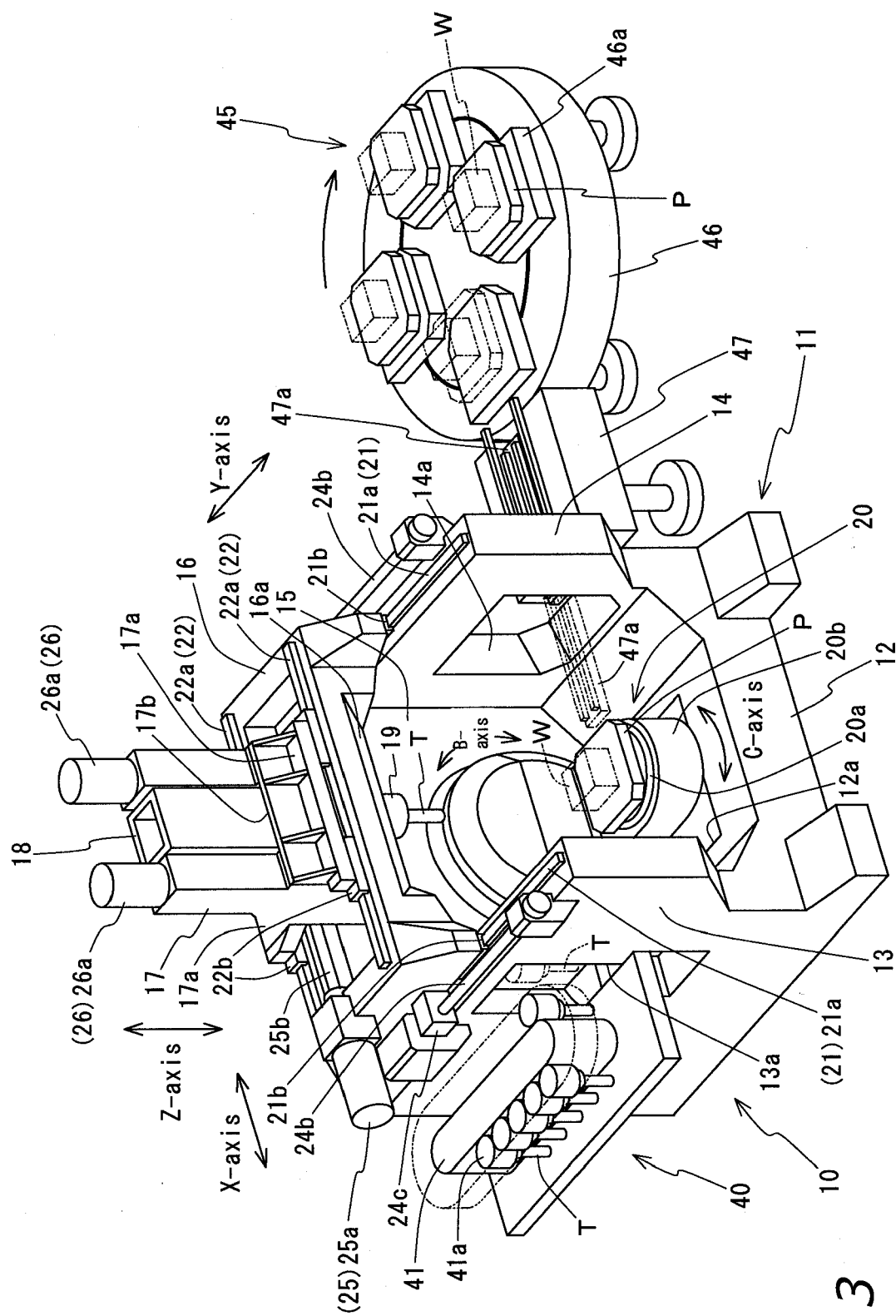
FIG. 3 is an oblique schematic view showing the machine tool, a tool changing device, and a pallet changing device according to a preferred embodiment of the invention.
Figure 4:
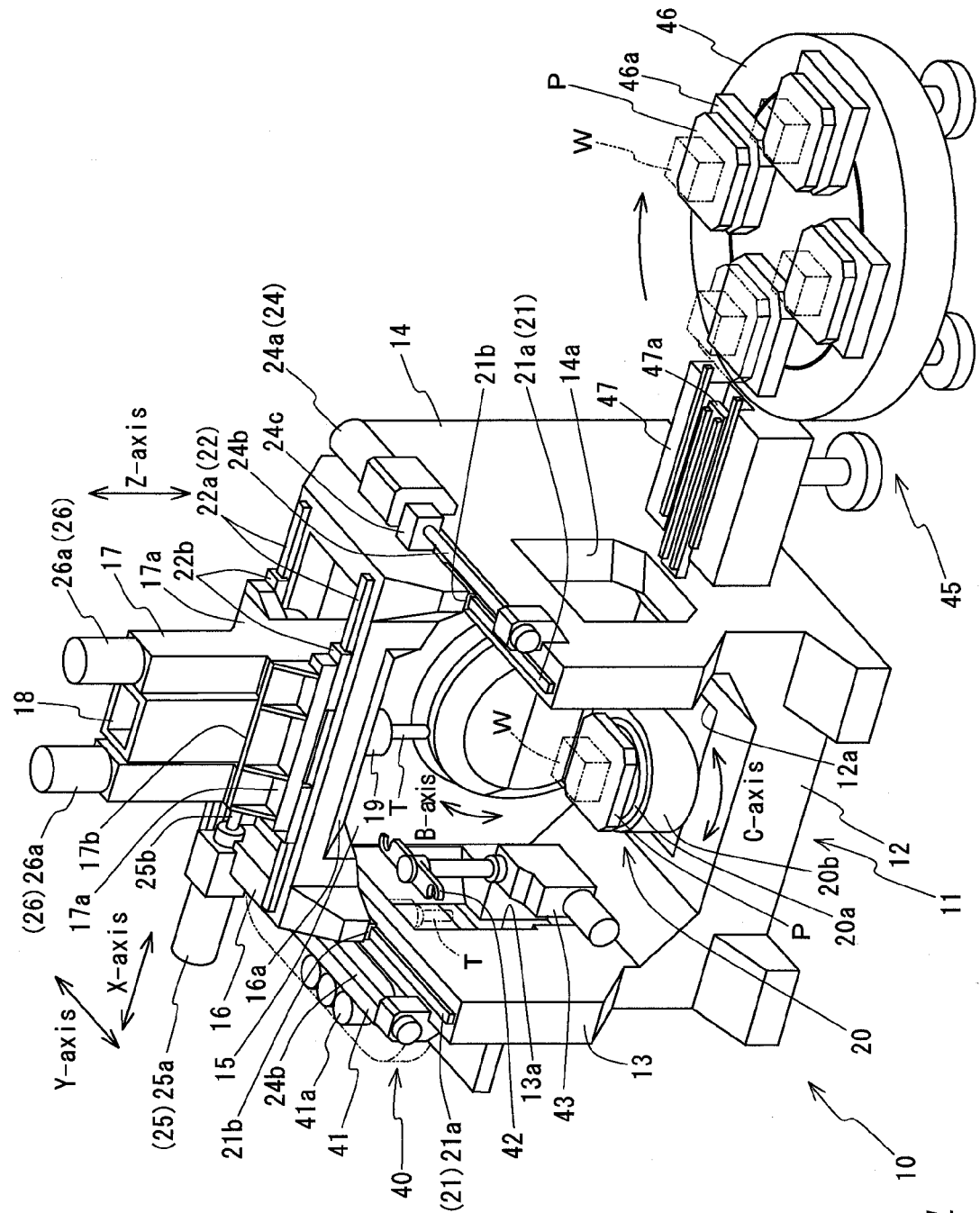
FIG. 4 is an oblique schematic view showing the machine tool, a tool changing device, and a pallet changing device according to a preferred embodiment of the invention.

As shown in FIG. 1 to FIG. 6, a machine tool 1 according to this embodiment of the invention has a machine tool unit 10 of a type known as a vertical machining center, a tool changing device 40, a pallet changing device 45, and a waste recovery device 50 attached to the machine tool unit 10, and a cover 60 covering at least the machine tool unit 10, tool changing device 40, and pallet changing device 45.

The machine tool unit 10 comprises a bed 11, a first saddle 16 that is disposed on the bed 11 and moves freely back and forth in a horizontal plane (along the Y-axis), a second saddle 17 that is disposed on the first saddle 16 and moves freely in a horizontal plane side to side (along the X-axis), a spindle head 18 that is disposed on the second saddle 17 and moves freely vertically (along the Z-axis), a main spindle 19 that holds a tool T and is supported by the spindle head 18 to rotate freely on the main spindle axis, and a table 20 on which a pallet P is mounted. Work W is fixed on top of the pallet P. The table 20 is disposed on the bed 11 and can swivel freely on an axis of rotation (B-axis) parallel to the Y-axis and rotate freely an axis of rotation (C-axis) perpendicular to the top surface of the pallet P.

The machine tool unit 10 also comprises a Y-axis guide mechanism 21 for guiding movement of the first saddle 16 along the Y-axis, an X-axis guide mechanism 22 for guiding movement of the second saddle 17 along the X-axis, a Z-axis guide mechanism (not shown in the figures) for guiding movement of the spindle head 18 along the Z-axis, a Y-axis feed mechanism 24 for moving the first saddle 16 along the Y-axis, an X-axis feed mechanism 25 for moving the second saddle 17 along the X-axis, a Z-axis feed mechanism 26 for moving the spindle head 18 along the Z-axis, a main spindle rotation drive mechanism (not shown in the figures) for rotating the main spindle 19 on its axis, a first table rotation drive mechanism (not shown in the figures) for swiveling the table 20 on the B-axis for indexing to a specific rotational angle position, and a second table rotation drive mechanism (not shown in the figures) for rotating the table 20 on the C-axis for indexing to a specific rotational angle position.

The bed 11 comprises a base 12 that is rectangular when seen in plan view, left and right side walls 13 and 14 (left side wall 13 on the front left side and right side wall 14 on the front right side) disposed vertically on both sides of the base 12 with a gap therebetween on the X-axis, and a side wall 15 (back side wall) disposed vertically to the base 12 at the back between the right and left side walls 13 and 14.

The base 12 has a waste removal hole 12a of which one end opens to the top center portion of the base 12 and the other end opens to the back outside surface of the base 12. The top of the base 12 and the base portion of the left side wall 13 and the base portion of the right side wall 14 decline into the opening to the waste removal hole 12a.

A tool changing opening 13a is formed through from the outside to the inside of the left side wall 13 so that a tool T can be delivered into and removed from the inside of the machine tool unit 10 (the space enclosed by side walls 13, 14, 15) when the tool changing device 40 changes the tool T. A pallet changing opening 14a is formed through from the outside to the inside of the right side wall 14 so that a pallet P can be delivered into and removed from the inside of the machine tool unit 10 (the space enclosed by side walls 13, 14, 15) when the pallet changing device 45 changes the pallet P.

The table 20 comprises a pallet mounting unit 20a on which a pallet P is mounted, and a support unit 20b which is supported on the inside of the back side wall 15 of the bed 11 to swivel freely on the B-axis and supports the pallet mounting unit 20a to rotate freely on the C-axis. The table 20 is located in the space enclosed by the side walls 13, 14, 15 so that the pallet P mounted on the pallet mounting unit 20a is substantially positioned above the waste removal hole 12a, and there is a constant gap between the bottom of the support unit 20b and the top of the base 12.

The pallet mounting unit 20a is rotated on the C-axis by the second table rotation drive mechanism (not shown in the figures) and indexed to a specific rotational angle position, and the support unit 20b is swiveled on the B-axis by the first table rotation drive mechanism (not shown in the figures) and indexed to a specific rotational angle position. The work W on the pallet P can thus be indexed to a desired angular position by rotating the support unit 20b on the B-axis to swivel the pallet P on the B-axis, and by rotating the pallet P with the pallet mounting unit 20a on the C-axis.

Figure 6:
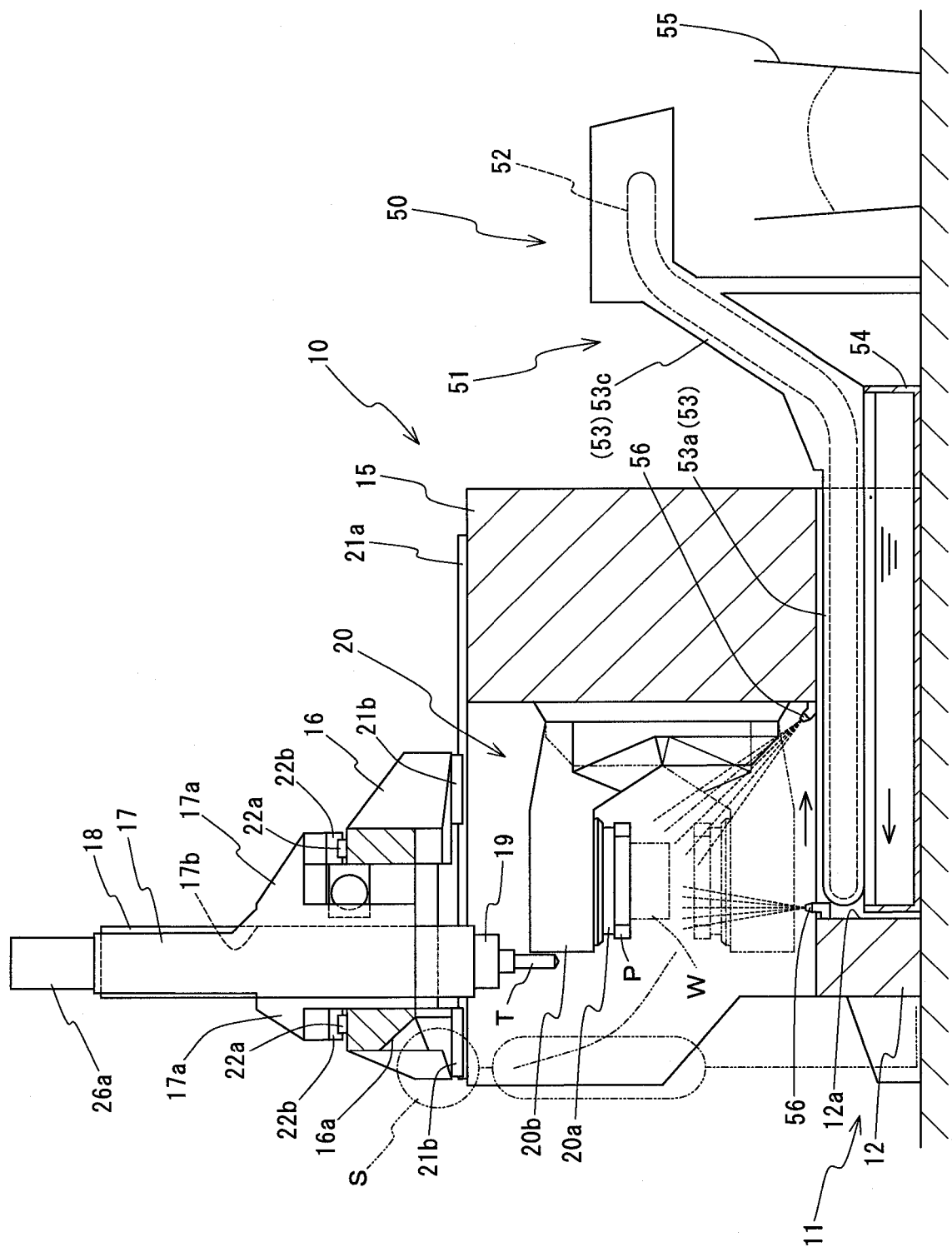
FIG. 6 is a section view through line A—A in FIG. 5.
Figure 7:
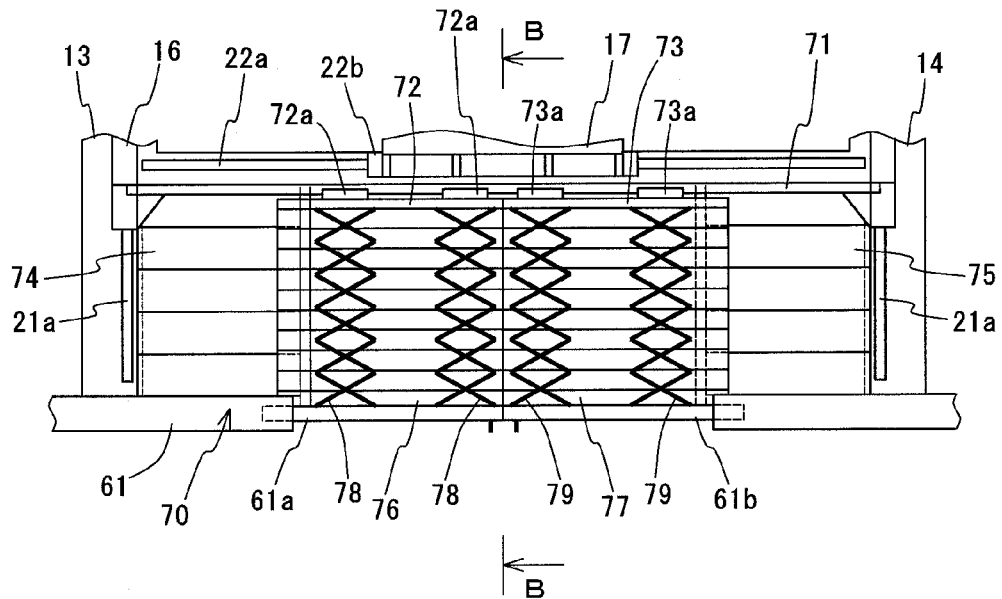
FIG. 7 is a plan view showing a part of the top cover in a preferred embodiment of the invention.
Figure 8:
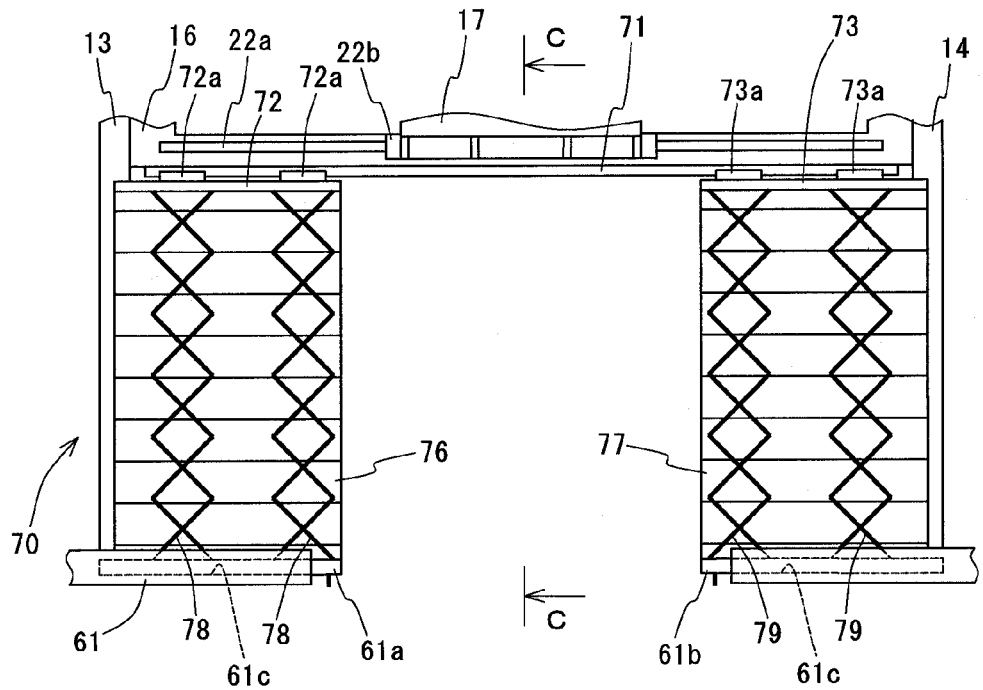
FIG. 8 is a plan view showing a part of the top cover in a preferred embodiment of the invention.
Figure 9:
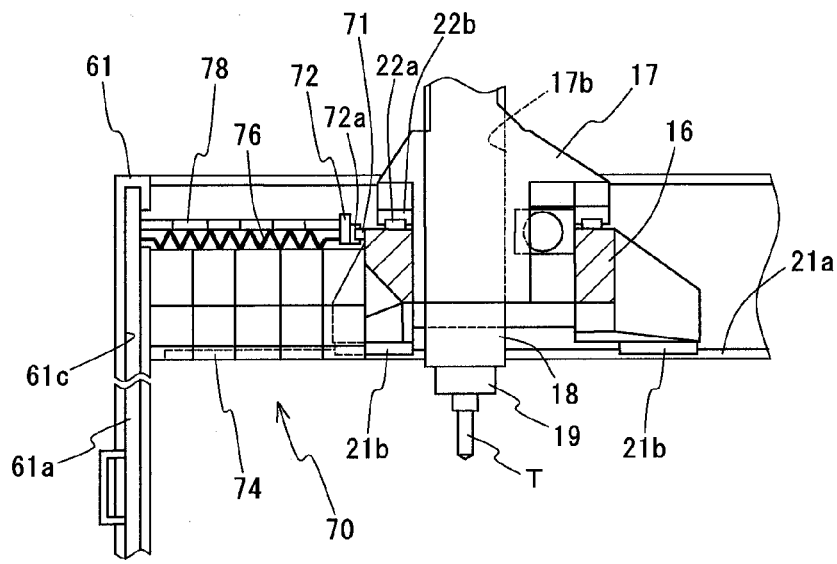
FIG. 9 is a section view through line B—B in FIG. 7.
Figure 10:
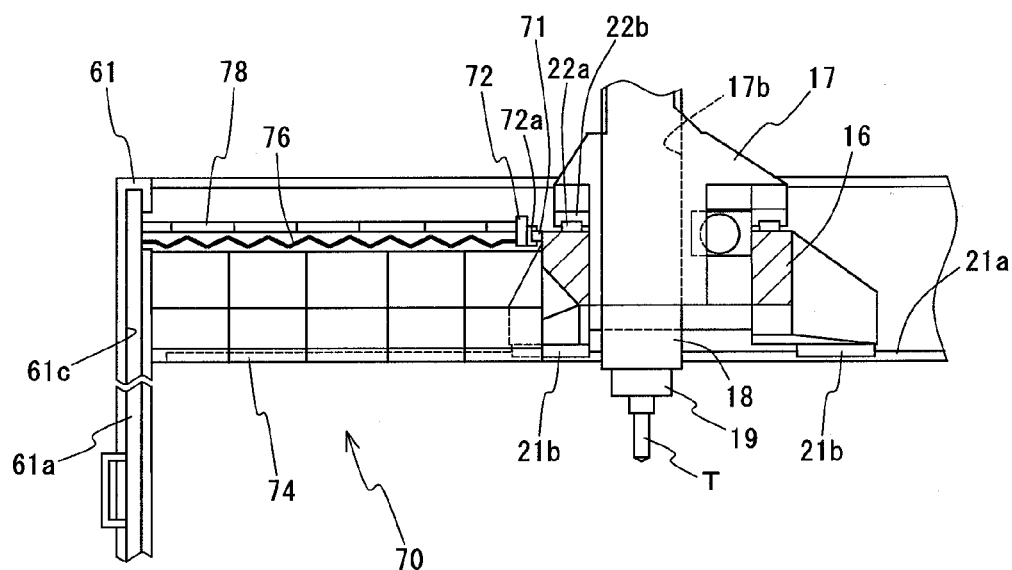
FIG. 10 is a section view through line C—C in FIG. 8.

The first saddle 16 has a rectangular frame shape with the transverse side parallel to the X-axis and the longitudinal side parallel to the Y-axis. The end portions of the long transverse sides are supported to move freely along the Y-axis on the top of the left side wall 13 and right side wall 14 of the bed 11. A recess 16a is formed in the front outside surface between both ends of the long side of the first saddle 16. As shown in FIG. 6, when the first saddle 16 moves toward the front of the bed 11, the recess 16a prevents the front outside surface of the first saddle 16 from striking a worker S working at the front side of the bed 11.

The second saddle 17 comprises a shoulder 17a extending to each side in the Y-axis direction, and a through-hole 17b passing vertically through the second saddle 17. The second saddle 17 is disposed within the frame of the first saddle 16 with the shoulders 17a supported by the top of the transverse portions of the first saddle 16 so that the second saddle 17 can move freely on the X-axis.

The spindle head 18 is supported to move freely on the Z-axis inside the through-hole 17b in the second saddle 17. The main spindle 19 is disposed above the table 20 with the main spindle axis parallel to the Z-axis and the main spindle 19 freely rotatably supported by the bottom portion of the spindle head 18.

The Y-axis guide mechanism 21 comprises guide rails 21a aligned with the Y-axis on the top of the left side wall 13 and right side wall 14 of the bed 11, and sliders 21b that are affixed to the bottom of both long end parts of the first saddle 16 and engage and move freely on the guide rails 21a.

The Y-axis feed mechanism 24 comprises drive motors 24a disposed on the top of left side wall 13 and right side wall 14 of the bed 11, ball screws 24b, and nuts 24c. The ball screws 24b are disposed aligned with the Y-axis on the top of the left side wall 13 and right side wall 14 of the bed 11, and are axially rotated by the corresponding drive motors 24a. The nuts 24c are affixed to the outside surfaces of the longitudinal portions of the first saddle 16, and screw onto the matching ball screws 24b.

When the drive motors 24a of this Y-axis feed mechanism 24 are driven and the ball screws 24b thus turn axially, the nuts 24c move along the ball screws 24b and the first saddle 16 thus moves on the Y-axis guided by the guide rails 21a and sliders 21b of the Y-axis guide mechanism 21.

The X-axis guide mechanism 22 comprises guide rails 22a disposed aligned with the X-axis on the top of the transverse side portions of the first saddle 16, and sliders 22b that are affixed to the bottoms of the shoulders 17a of the second saddle 17 and engage and move freely on the guide rails 22a.

The X-axis feed mechanism 25 comprises a drive motor 25a disposed on one longitudinal side portion of the first saddle 16, a ball screw 25b that is disposed on the X-axis inside the frame of the first saddle 16 and is axially rotated by the drive motor 25a, and a nut (not shown in the figures) that is affixed to the second saddle 17 and screws onto the ball screw 25b.

When the drive motor 25a of this X-axis feed mechanism 25 is driven and the ball screw 25b turns axially, the nut moves along the ball screw 25b and the second saddle 17 thus moves along the X-axis guided by the guide rails 22a and sliders 22b of the X-axis guide mechanism 22.

The Z-axis guide mechanism (not shown in the figures) comprises guide rails (not shown in the figures) aligned with the Z-axis on the inside of both X-axis sides of the through-hole 17b of the second saddle 17, and sliders (not shown in the figures) that are affixed to the outside of both X-axis sides of the spindle head 18 and engage and move freely on these guide rails (not shown in the figures).

The Z-axis feed mechanism 26 comprises drive motors 26a disposed on the top of both X-axis sides of the second saddle 17, ball screws (not shown in the figures) that are disposed aligned with the Z-axis on the inside of both X-axis sides of the second saddle 17 and are axially rotated by the drive motors 26a, and nuts (not shown in the figures) that are affixed to the outside of both X-axis sides of the spindle head 18 and screw onto the ball screws (not shown in the figures).

When the drive motors 26a of this Z-axis feed mechanism 26 are driven and the ball screws (not shown in the figures) turn axially, the nuts (not shown in the figures) move along the ball screws so that the spindle head 18 moves on the Z-axis guided by the guide rails (not shown in the figures) and sliders (not shown in the figures) of the Z-axis guide mechanism (not shown in the figures).

The tool changing device 40 comprises a tool magazine 41, a tool changing arm 42, and a drive mechanism unit 43. The tool magazine 41 is supported on the outside of the left side wall 13 of the bed 11, and has a plurality of holding units 41a each holding a tool T. The tool changing arm 42 swivels horizontally, grips the tool T held in the main spindle 19 on one end, and is inserted from the tool magazine 41 through the tool changing opening 13a in the left side wall 13 to the inside of the machine tool unit 10 to grip the (next) tool T positioned at a predetermined position with the other end. The drive mechanism unit 43 is supported on the inside surface of the left side wall 13 and supports the tool changing arm 42, and causes the tool changing arm 42 to rotate horizontally and move vertically.

The tool changing device 40 replaces the tool T on the main spindle 19 with the next tool T set to a predetermined position (indicated by the imaginary line in FIG. 3 and FIG. 4) as a result of the horizontal rotation and vertical movement of the tool changing arm 42 driven by the drive mechanism unit 43, and introduces and removes the tools T through the tool changing opening 13a in the left side wall 13.

The pallet changing device 45 has pallet moving table 46 and a pallet moving mechanism 47. The pallet moving table 46 has a plurality of pallet tables 46a on top of which the pallets P are placed, and rotates the pallet tables 46a on a vertical axis of rotation in the direction of the arrows shown in FIG. 3 and FIG. 4. The pallet moving mechanism 47 is located between the machine tool unit 10 and the pallet moving table 46, and moves a pallet P between the pallet table 46a rotated to a predetermined position by the pallet moving table 46 and the table 20 inside the machine tool unit 10.

The pallet moving mechanism 47 has a conveyance member 47a that can move to and away from the table 20 through the pallet changing opening 14a in the right side wall 14 of the bed 11. When moving a pallet P, the conveyance member 47a moves to the table 20 to place or remove a pallet P on the table 20 through the pallet changing opening 14a, and thus replaces the pallet P carrying the processed work W on the table 20 with a new pallet P carrying unprocessed work W.

Loading and unloading work W on a pallet P is done by a worker, for example, after the pallet moving table 46 has rotated the pallet table 46a (pallet P) to a predetermined rotational position where the processed work W is removed from the pallet P and an unprocessed workpiece W is mounted on the pallet P.

The pallet changing device 45 replaces the pallet P to replace the work W on the table 20 in this embodiment of the invention, but the invention is not so limited. If the work W is small or light, a worker can manually replace the work W on the table 20. If the work W is large or heavy, however, a crane or other type of hoist can be used to directly load and unload the work W on the table 20. Work can proceed efficiently even if a hoist is used to load and unload the work W in a machine tool 1 according to this embodiment of the invention because opening the doors 61a and 61b of the first cover 61 to the sides also opens the first left top cover 76 and first right top cover 77 to the sides as further described below.

The waste recovery device 50 comprises a discharge mechanism 51, a storage tank 54, a collection box 55, a plurality of nozzles 56, and a supply pump (not shown in the figures).

The discharge mechanism 51 conveys cutting waste resulting from processing the work W in a specific transportation direction and removes the waste from the machine tool unit 10. The storage tank 54 is disposed below the discharge mechanism 51 on the upstream side of the waste transportation direction, and stores the cutting fluid. The collection box 55 is disposed below the discharge mechanism 51 at the downstream end of the transportation direction. A plurality of nozzles 56 are disposed inside the waste removal hole 12a at the top of the opening in the base 12, and on the back side wall 15 at the top of the waste removal hole 12a in the base 12. The supply pump (not shown in the figures) supplies cutting fluid from the storage tank 54 to the plural nozzles 56 for discharge to the work W.

The discharge mechanism 51 comprises a conveyor belt 52 composed of a plurality of plates connected in an endless loop for carrying cutting waste to the collection box 55, and a support unit 53 that houses and enables the conveyor belt 52 to move freely in a loop. The support unit 53 has a horizontal portion 53a disposed inside the waste removal hole 12a, and an incline portion 53c disposed outside the machine tool 1. The discharge mechanism 51 also has a drive motor (not shown in the figures) that causes the conveyor belt 52 to move in the direction of the arrows shown in FIG. 6.

The horizontal portion 53a of the support unit 53 is open on the top and bottom. Waste and cutting fluid drop from this open portion 53b onto the conveyor belt 52, and cutting fluid that drops onto the conveyor belt 52 flows down through this open portion 53b into the storage tank 54 as further described below. The bottom of the downstream end part of the incline portion 53c of the support unit 53 is open, and waste conveyed by the conveyor belt 52 drops through this opening (not shown in the figures) into the collection box 55 below.

The storage tank 54 is located below the horizontal portion 53a of the support unit 53 and collects the cutting fluid that drops from the conveyor belt 52.

The nozzles 56 are arranged to discharge cutting fluid supplied by the supply pump (not shown in the figures) through supply tubes not shown upward toward the pallet P on the table 20.

With this waste recovery device 50, waste and cutting fluid are guided into the waste removal hole 12a by the inclined top of the base 12, the inclined base portions where the left side wall 13 and right side wall 14 meet the base 12, and covers not shown disposed appropriately in the space enclosed by the side walls 13, 14, 15, and drop from this waste removal hole 12a onto the conveyor belt 52, which is driven circularly by a drive motor (not shown in the figures). The cutting waste is then conveyed outside the machining center by the conveyor belt 52, falls into the collection box 55 located below the downstream end of the conveyor belt 52, and is recovered. The cutting fluid drops from the conveyor belt 52 and is collected in the storage tank 54.

Figure 5:
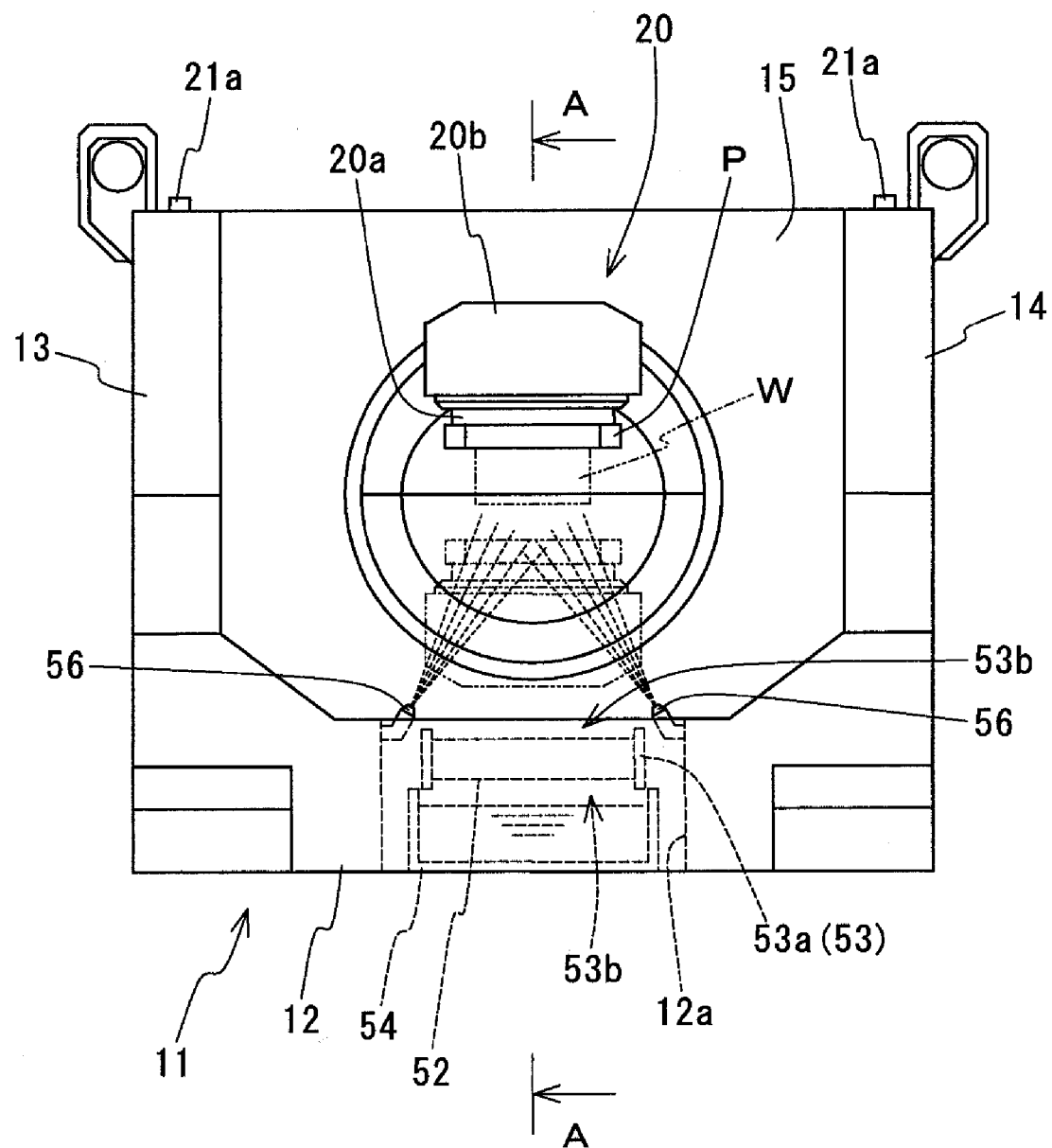
FIG. 5 is a front view showing a part of a machine tool according to a preferred embodiment of the invention.

As shown in FIG. 5 and FIG. 6, the support unit 20b of the table 20 is swiveled 180 degrees on the B-axis by the first table rotation drive mechanism (not shown in the figures) so that the support unit 20b and the work W on the pallet P attached to the pallet mounting unit 20a are upside down. Cutting fluid is then supplied from the supply pump (not shown in the figures) and discharged from the nozzles 56 to remove any cutting waste left on the support unit 20b, the pallet mounting unit 20a, the pallet P, and the work W, for example. The waste thus removed drops onto the conveyor belt 52 from the waste removal hole 12a, and is conveyed outside the machine tool unit 10 and recovered.

The cover 60 includes a first cover 61 covering the outside of the machine tool unit 10 and the tool changing device 40; a second cover 62 that is connected to the first cover 61 and covers the pallet changing device 45; a top cover 70 that is connected to the first cover 61 and covers the top of the opening enclosed by the side walls 13, 14, 15 of the bed 11; a telescopic third cover 63 that is rendered inside the frame of the first saddle 16 of the machine tool unit 10 to enable movement of the second saddle 17 on the X-axis; a tool changer door (not shown in the figures) for closing the tool changing opening 13a in the left side wall 13 of the bed 11; and a pallet changer door (not shown in the figures) for closing the pallet changing opening 14a in the right side wall 14 of the bed 11.

The tool changer door (not shown in the figures) can be opened as needed during the tool changing operation of the tool changing device 40, and the pallet changer door (not shown in the figures) can be opened as needed during the pallet changing operation of the pallet changing device 45.

The first cover 61 comprises a left door 61a that opens by sliding to the left side wall 13 of the bed 11 at the front of the machine tool unit 10, and a right door 61b that slides to the right side wall 15 to open. The opened doors 61a and 61b are housed in pockets 61c rendered in the front of the first cover 61.

The second cover 62 comprises doors 62a that slide to the right and left to open similarly to the first cover 61. Work W can be placed on and removed from the pallets P on the pallet moving table 46 of the pallet changing device 45 through the opening afforded by these doors 62a.

The top cover 70 comprises a guide rail 71 disposed on the front top portion of the first saddle 16 and aligned with the X-axis; a left moving member 72 and a right moving member 73 having sliders 72a and 73a that engage and move freely on the guide rail 71; a first left top cover 76 and a first right top cover 77 with the front and back end portions connected to the tops of the doors 61a and 61b of the first cover 61 and to the moving members 72 and 73; a second left top cover 74 and a second right top cover 75 disposed below the first left top cover 76 and first right top cover 77; and a left linkage member 78 and a right linkage member 79 disposed above the first top covers 76 and 77 with the end parts connected to the top inside of the doors 61a and 61b of the first cover 61 and to the moving members 72 and 73.

The first top covers 76 and 77 are bellows-like covers enabling movement of the first saddle 16 on the Y-axis. The front part of the first left top cover 76 is attached to the top inside part of the left door 61a, and the back part is attached to the left moving member 72. The front part of the first right top cover 77 is attached to the top inside part of the right door 61b, and the back part is attached to the right moving member 73.

The linkage members 78 and 79 comprise a pantograph mechanism enabling movement of the first saddle 16 on the Y-axis, and two linkage members are disposed on each of the first top covers 76 and 77. The ends of the left linkage member 78 are affixed to the top inside part of the left door 61a and to the left moving member 72, and the ends of the right linkage member 79 are affixed to the top inside part of the right door 61b and to the right moving member 73.

The second top covers 74 and 75 are telescopic covers that enable movement of the first saddle 16 on the Y-axis. The second left top cover 74 is disposed with the bottom part attached to the top of the left side wall 13 of the bed 11 inside of the guide rails 21a of the Y-axis guide mechanism 21, the back part below the guide rail 71 at the front left end part of the long side of the first saddle 16, and the front part attached to the top inside part of the first cover 61. The second left top cover 74 thus closes the gap between the top of the left side wall 13 and the first left top cover 76.

The first right top cover 75 is disposed with the bottom part attached to the top of the right side wall 14 of the bed 11 inside of the guide rails 21a of the Y-axis guide mechanism 21, the back part below the guide rail 71 at the front right end part of the long side of the first saddle 16, and the front part attached to the top inside part of the first cover 61. The second right top cover 75 thus closes the gap between the top of the right side wall 14 and the first right top cover 77.

The second top covers 74 and 75 do not cover the Y-axis guide mechanism 21 and Y-axis feed mechanism 24 because the bottom part of the covers is disposed inside of the guide rails 21a at the top of the side walls 13 and 14 of the bed 11.

The first cover 61, third cover 63, top cover 70, tool changer door (not shown in the figures), and pallet changer door (not shown in the figures) of the cover 60, and the covers (not shown in the figures) appropriately disposed on the inside of the side walls 13, 14, 15 of the bed 11, close the space (machining area) contained within the side walls 13, 14, 15, and prevent waste and cutting fluid from flying outside.

When the doors 61a and 61b of the first cover 61 open and close as shown in FIG. 1, FIG. 2, FIG. 7, and FIG. 8, the first top covers 76 and 77 are guided by the guide rail 71 and sliders 72a and 73a and move on the X-axis together with the linkage members 78 and 79 and moving members 72 and 73. As a result, opening and closing the doors 61a and 61b opens and closes the top part of the working area.

With the machine tool 1 according to this embodiment of the invention the first saddle 16 is guided by the Y-axis guide mechanism 21 and moved along the Y-axis by the Y-axis feed mechanism 24, the second saddle 17 is guided by the X-axis guide mechanism 22 and moved along the X-axis by the X-axis feed mechanism 25, the spindle head 18 is guided by the Z-axis guide mechanism (not shown in the figures) and moved along the Z-axis by the Z-axis feed mechanism 26, and the main spindle 19 is driven rotationally on its axis by the main spindle rotation drive mechanism (not shown in the figures), and the work W held on the pallet P placed on the table 20 is thus machined by the tool T held on the main spindle 19.

Waste produced by machining and cutting fluid supplied appropriately to where the tool T and work W contact drop from the waste removal hole 12a onto the conveyor belt 52. The waste is conveyed by the conveyor belt 52 and recovered in the collection box 55, and the cutting fluid flows down and off the conveyor belt 52 into the storage tank 54 located below the conveyor belt 52.

The pallet mounting unit 20a of the table 20 is rotated on the C-axis and indexed to a predetermined rotational angle position by the second table rotation drive mechanism (not shown in the figures), and the support unit 20b of the table 20 is swiveled on the B-axis by the first table rotation drive mechanism (not shown in the figures) and indexed to a predetermined rotational angle position, to index the pallet P (the work W on the pallet P) to a specific rotational angle position on the C-axis and a specific rotational angle position on the B-axis for processing. The tool changing device 40 also changes the tool T as needed through the tool changing opening 13a in the left side wall 13 of the bed 11.

When the first saddle 16 moves on the Y-axis, the first top covers 76 and 77, second top covers 74 and 75, and linkage members 78 and 79 do not interfere with movement of the first saddle 16 on the Y-axis because the first top covers 76 and 77, second top covers 74 and 75, and linkage members 78 and 79 can also move freely extending and retracting along the Y-axis.

When the machining process is completed, the first table rotation drive mechanism (not shown in the figures) swivels the support unit 20b of the table 20 on the B-axis to turn the work W on the pallet P upside down, and cutting fluid is then discharged from the nozzles 56 to remove any waste on the support unit 20b, the pallet mounting unit 20a, the pallet P, or the work W, for example. The removed waste drops through the waste removal hole 12a onto the conveyor belt 52 whereby the waste is conveyed out from the working area and recovered into the collection box 55.

The first table rotation drive mechanism (not shown in the figures) then again swivels the support unit 20b of the table 20 on the B-axis to the upright horizontal position, and the pallet changing device 45 changes the pallet P through the pallet changing opening 14a in the right side wall 14 of the bed 11.

When a worker opens and closes the doors 61a and 61b of the first cover 61 of a machine tool 1 according to this embodiment of the invention, the first top covers 76 and 77 are guided by the guide rail 71 and sliders 72a and 73a and move on the X-axis together with the linkage members 78 and 79 and moving members 72 and 73, and thus open and close together with the doors 61a and 61b.

A worker can therefore easily open and close the top of the machining area of a machine tool 1 according to this embodiment of the invention by simply opening and closing the doors 61a and 61b, and work W can therefore be efficiently mounted on and dismounted from the table 20 using a crane or other hoist mechanism, for example.

By rendering the first top covers 76 and 77 as telescopic bellows that can extend and retract freely on the Y-axis, the rigidity of the covers is low. Even if the front part of the first top covers 76 and 77 moves on the X-axis when the doors 61a and 61b are opened and closed, the back part of the first top covers 76 and 77 may not move with the front part due to the low rigidity of the covers. However, by providing linkage members 78 and 79 connecting the back part (the moving members 72 and 73) of the first top covers 76 and 77 to the doors 61a and 61b of this machine tool 1, the back part of the first top covers 76 and 77 can be moved in conjunction with opening and closing the doors 61a and 61b (that is, in conjunction with moving the front part of the first top covers 76 and 77). This prevents damaging the first top covers 76 and 77 and prevents the first top covers 76 and 77 from not opening or closing completely.

Furthermore, if the first top covers 76 and 77 are disposed above the tops of the right and left side walls 13 and 14 of the bed 11 in order to increase the size of the opening afforded by the first top covers 76 and 77 more than a predetermined size, to open the first top covers 76 and 77 without interfering with the right and left side walls 13 and 14 of the bed 11, or to increase the height at which the first top covers 76 and 77 are located, a gap may result between the side walls 13 and 14 and the first top covers 76 and 77, and waste and cutting fluid may escape through this gap outside the machine tool 1. The machine tool 1 according to this embodiment of the invention effectively prevents waste and cutting fluid from exiting through this gap, however, by providing second top covers 74 and 75 closing this gap.

In addition, because the table 20 is disposed inside the space enclosed by the three side walls 13, 14, 15 of the bed 11, both ends of the long sides of the first saddle 16 are supported on top of the right and left side walls 13 and 14 of the bed 11 to move freely on the Y-axis, the second saddle 17 is disposed movably on the X-axis inside the frame of the first saddle 16, and the spindle head 18 is disposed movably on the Z-axis inside the through-hole 17b of the second saddle 17, the first saddle 16, the second saddle 17, and the spindle head 18 can also be disposed above the top of the table 20.

This makes it difficult for cutting waste and cutting fluid to enter the Y-axis feed mechanism 24 and Y-axis guide mechanism 21, the X-axis feed mechanism 25 and X-axis guide mechanism 22, and the Z-axis feed mechanism 26 and Z-axis guide mechanism (not shown in the figures). Waste and cutting fluid can therefore be prevented from entering the Y-axis, X-axis, and Z-axis feed mechanisms 24, 25, 26 and the Y-axis, X-axis, and Z-axis guide mechanisms 21 and 22 using only the top cover 70 and third cover 63, and separate covers for the Y-axis, X-axis, and Z-axis feed mechanisms 24, 25, 26 and the Y-axis, X-axis, and Z-axis guide mechanisms 21 and 22 are not needed. As a result, the parts count and the manufacturing cost of the cover 60 can be reduced, and maintenance of the cover 60 can be simplified.

The first saddle 16 is also rendered with a rectangular frame shape, the second saddle 17 is disposed inside the frame of the first saddle 16, the spindle head 18 is disposed inside a through-hole 17b formed vertically through the second saddle 17, and a support structure for the saddle and spindle head that projects from the front is thus not used. Deflection and other deformation of the bed 11, first saddle 16, and second saddle 17 are therefore prevented, and work W can be machined with high precision.

Play and a change in attitude can also be prevented when moving the first saddle 16 and spindle head 18, and high precision machining is thus afforded, by driving both long-end portions of the first saddle 16 by means of a Y-axis feed mechanism 24 comprising two drive motors 24a, ball screws 24b, and nuts 24c, and driving both ends of the spindle head 18 by means of a Z-axis feed mechanism 26 comprising two drive motors 26a, ball screws (not shown in the figures), and nuts (not shown in the figures).

Yet further, by rendering a recess 16a at the front outside surface between the ends of the long sides of the first saddle 16, the front outside surface of the first saddle 16 can be prevented from striking a worker S working at the front of the bed 11 when the first saddle 16 moves to the front side of the bed 11.

A pallet P on the table 20 can be swiveled and indexed on the B-axis by means of a first table rotation drive mechanism (not shown in the figures) and can also be rotated and indexed on the C-axis by means of a second table rotation drive mechanism (not shown in the figures). The work W (pallet P) therefore needs to be mounted on the table 20 only once in order to complete a processing sequence, including machining the outside of the work W, thus improving efficiency and machining precision.

The tool changing device 40 and pallet changing device 45 also enable more efficient tool changing and pallet changing, the tool changing device 40 is disposed on the left side wall 13 side of the bed 11 and changes tools through a tool changing opening 13a in the left side wall 13, and the pallet changing device 45 is disposed on the right side wall 14 side of the bed 11 and changes the pallets through a pallet changing opening 14a in the right side wall 14. Thus rendering the tool changing device 40 and pallet changing device 45 on the sides prevents interference with tasks performed by a worker S at the front of the bed 11.

A waste removal hole 12a is rendered as an opening in the top of the base 12 of the bed 11, and a waste recovery device 50 is disposed inside the waste removal hole 12a. Waste and cutting fluid can thus be efficiently discharged from the opening of the waste removal hole 12a in the base 12 and recovered by the waste recovery device 50.

Furthermore, when processing the work W is finished, the first table rotation drive mechanism (not shown in the figures) swivels the support unit 20b on the table 20 on the B-axis to invert the work W on the pallet P, and cutting fluid is then discharged from the nozzles 56 to effectively and efficiently remove any waste on the support unit 20b, the pallet mounting unit 20a, the pallet P, and the work W. Waste can therefore be efficiently removed, and waste and cutting fluid are prevented from being removed from the machine tool unit 10.

A preferred embodiment of the present invention is described above, and it will be obvious to one with ordinary skill in the related art that the invention is not limited to this embodiment.

Figure 11:
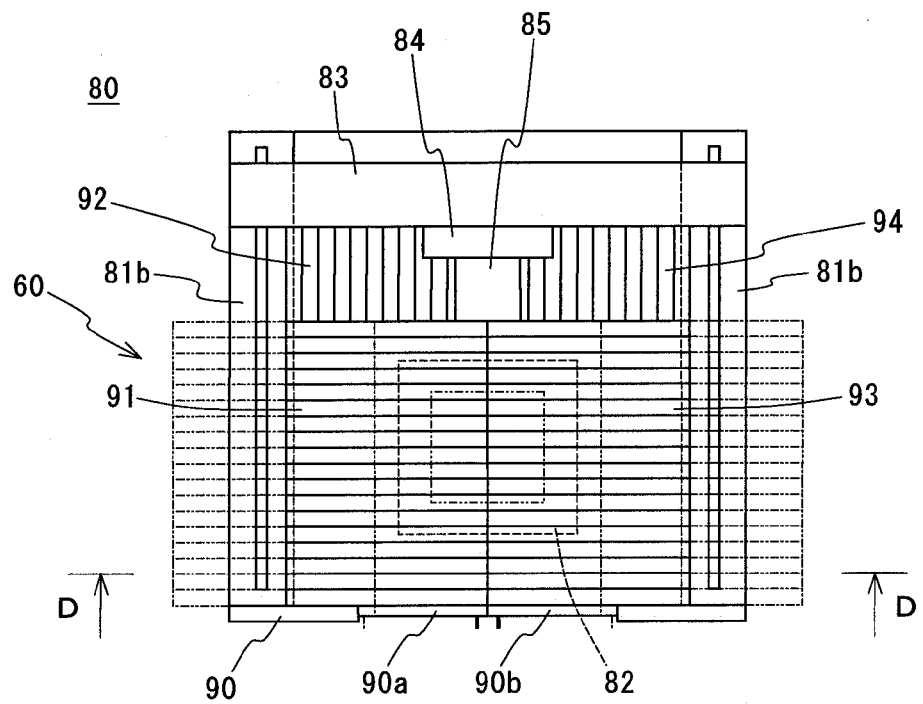
FIG. 11 is a front schematic view of a machine tool according to another embodiment of the invention.
Figure 12:
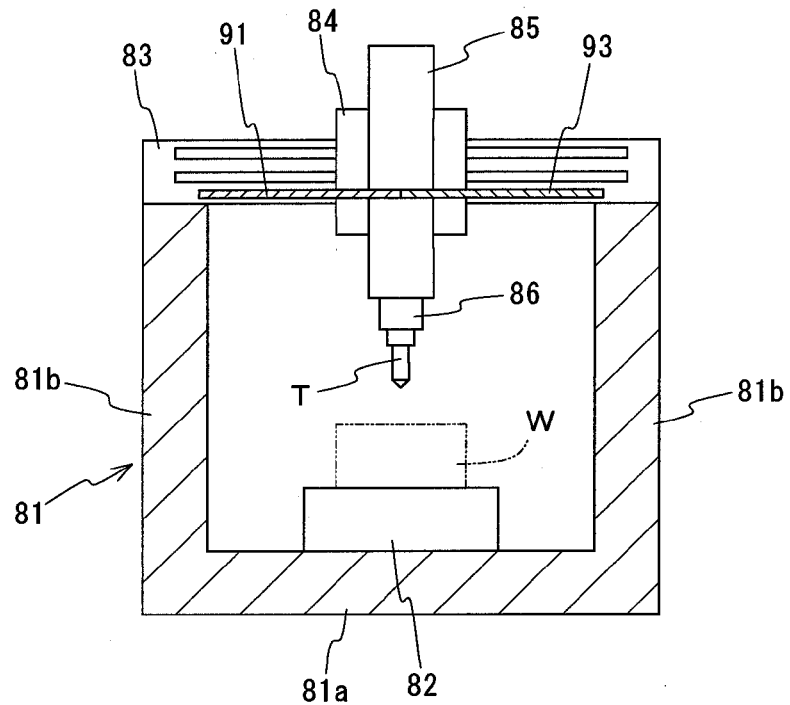
FIG. 12 is a section view through line D—D in FIG. 11.

The cover 60 according to the present invention can be applied to a machine tool 80 such as shown in FIG. 11 and FIG. 12, for example. In this arrangement the cover 60 includes a front cover 90 disposed on the front side of the bed 81, and a first left top cover 91, second left top cover 92, first right top cover 93, and second right top cover 94 disposed above the tops of the side walls 81b of the bed 81.

This machine tool 80 has a bed 81 composed of a rectangular base 81a and two opposing side walls 81b rising vertically from the left and right sides of the base 81a with a gap between the walls, a table 82 which is disposed on top of the base 81a of the bed 81 and on which work W is held, a cross beam 83 made from a long beam disposed lengthwise between the right and left sides with the longitudinal end parts of the cross beam supported on top of the side walls 81b of the bed 81 so that the cross beam 83 can move freely in a horizontal plane in the front-to-back direction of the bed, a saddle 84 that is supported to move freely horizontally side-to-side (right-to-left) in front of the cross beam 83, a spindle head 85 that is supported to move freely vertically in front of the saddle 84, and a main spindle 86 that holds a tool T and is supported by the bottom end portion of the spindle head 85 so that the axis of the main spindle is vertical and the main spindle 86 can rotate freely on the main spindle axis above the table 82.

The front cover 90 has a left door 90a and a right door 90b that slide to the left and right sides to open. The front cover 90 is disposed in front of the base 81a of the bed 81 in order to close the front of the space between the side walls 81b of the bed 81.

The first left top cover 91 and first right top cover 93 can extend and retract freely back and forth, allowing the spindle head 85 (cross beam 83) to travel back and forth. The back part of the first left top cover 91 is connected freely movably side-to-side to a guide member (not shown in the figures) that is appropriately disposed in the side-to-side direction to the front of the cross beam 83 with the spindle head 85 between the guide member and the cross beam 83, and the front part of the first left top cover 91 is connected to the top part of the left door 90a. The back part of the first right top cover 93 is connected freely movably side-to-side to the same guide member (not shown in the figures), and the front part is connected to the top part of the right door 90b.

The second left top cover 92 and the second right top cover 94 can extend and retract freely in the side-to-side direction, allowing the spindle head 85 (saddle 84) to move side-to-side. The second left top cover 92 is suitably supported by the left side of a cover (not shown in the figures) covering the spindle head 85 and the front of the cross beam 83, and covers the gap between the left side of the spindle head 85, the side wall 81b on the left side of the bed 81, the front of the cross beam 83, and the first left top cover 91. The second right top cover 94 is suitably supported by the right side of a cover (not shown in the figures) covering the spindle head 85 and the front of the cross beam 83, and covers the gap between the right side of the spindle head 85, the right side wall 81b of the bed 81, the front of the cross beam 83, and the first right top cover 93.

This arrangement enables opening and closing the first left top cover 91 and first right top cover 93 by opening and closing the doors 90a and 90b, and thus affords the same effect described above. In addition, the top covers 91, 92, 93, and 94 do not interfere with the back-and-forth, side-to-side, or vertical movement of the spindle head 85.

A vertical machining center is used herein as an example of a machine tool 1, 80 according to the present invention, but the first cover 61, front cover 90, and top covers 70, 91, 92, 93, and 94 described in these embodiments can obviously be adapted for use with a horizontal machining center. The structure of the bed and the arrangement of the moving bodies (saddles 16, 17, and 84, spindle heads 18 and 85, and cross beam 83) are also not limited to these examples and can obviously be modified in many ways.

Furthermore, the arrangement of the doors 61a, 61b, 90a, and 90b of the first cover 61 and front cover 90 are also not limited to these embodiments. The arrangement of the extensible/retractable covers 74, 75, 76, 77, 91, 92, 93, 94 is also not limited to a telescopic bellows-like cover as described above. These covers can be rendered as sheets that can be rolled down and rolled up, for example.

What is claimed is:

1. A machine tool comprising:
   a bed;
   a table arranged on the bed, for carrying a workpiece;
   a moving component disposed on the bed and provided free to travel at least on a horizontal first axis that is front-to-rear oriented;
   a main spindle supported by the moving component to rotate freely on the main spindle axial center, for holding a tool;
   a feed mechanism for shifting the table and the moving component relative to each other along three orthogonal axes including the first axis, to shift the table and the main spindle relative to each other within a machining area; and
   a machining-area-covering cover for covering a front side of the machining area with a front cover and covering a top side of the machining area with a first top cover; wherein
      the front cover is provided on the front side of the bed and is furnished with a door that opens and closes traveling along a horizontal second axis perpendicular to the first axis, and
      the first top cover is configured with a first end connected shiftably along the second axis to the front side of the moving component, and with a second end connected extensibly and retractably along the first axis to the top part of the front-cover door, therein being configured for permitting first-axis-directed movement of the moving component.

2. A machine tool as set forth in claim 1, further comprising a linkage member disposed along the first top cover, with one end of the linkage member connected to the first end of the first top cover and the other end connected to the top part of the front-cover door, wherein
   the linkage member is configured to be extensible and retractable along the first axis, therein being configured for permitting first-axis-directed movement of the moving component.

3. A machine tool as set forth in claim 1, wherein:
   the bed comprises a rectangular base, two sidewalls provided standing along respective sides of the base and opposing each other across an interval;
   the moving component is supported free to travel along the first axis on top portions of the two side walls of the bed; and
   the first top cover is disposed above the upper surfaces of the two side walls of the bed;
   the machine tool further comprises second top covers disposed between the two side walls of the bed and the first top cover to close gaps between the side walls and the first top cover; and
   the second top covers are configured with one end connected to the front side of the moving component, and with another end connected extensibly and retractably along the first axis to a top inside part of the front cover, therein being configured for permitting first-axis-directed movement of the moving component.

* * * * *